US006648577B2

(12) United States Patent
Obriot

(10) Patent No.: US 6,648,577 B2
(45) Date of Patent: Nov. 18, 2003

(54) VEHICLE SPARE TIRE CONTAINER

(76) Inventor: Kelly M. Obriot, 842 Three Mile Dr., Grosse Pointe Park, MI (US) 48230

( * ) Notice: Subject to any disclaimer, the term of this patent is extended or adjusted under 35 U.S.C. 154(b) by 115 days.

(21) Appl. No.: 09/879,595

(22) Filed: Jun. 12, 2001

(65) Prior Publication Data

US 2002/0187029 A1 Dec. 12, 2002

(51) Int. Cl.⁷ .............................................. B62D 43/04
(52) U.S. Cl. .................... 414/463; 224/42.23; 296/37.3
(58) Field of Search .................. 220/819; 224/42.2, 224/42.23; 296/37.2, 37.3; 414/462, 463, 464, 465, 466

(56) References Cited

U.S. PATENT DOCUMENTS

| | | | | |
|---|---|---|---|---|
| 1,244,417 A | * | 10/1917 | Brosman | 206/304 |
| 1,651,769 A | | 12/1927 | Hammond | |
| 1,658,696 A | | 2/1928 | Walrath | |
| 1,917,157 A | | 7/1933 | Ricci | |
| 4,516,706 A | | 5/1985 | Niehaus | 224/42.2 |
| 4,548,540 A | | 10/1985 | Renfro | 414/463 |
| 4,726,091 A | * | 2/1988 | Joyce | 220/819 X |
| 4,932,573 A | * | 6/1990 | Flint | 224/42.12 |
| 4,993,609 A | * | 2/1991 | Flint | 224/42.2 |
| 5,669,534 A | | 9/1997 | Edgerley | 224/42.23 |
| 5,823,413 A | | 10/1998 | Seltz | 224/402 |
| 6,279,793 B1 | * | 8/2001 | Treis | 224/42.23 |

* cited by examiner

Primary Examiner—Janice L. Krizek
(74) Attorney, Agent, or Firm—Harness, Dickey & Pierce, P.L.C.

(57) ABSTRACT

A generally cylindrical shaped unitary body container is adapted to hold a spare vehicle tire. The container is compatible with a vehicle cable retraction system and has at least one aperture through which a horizontal member at the cable terminus supports the container. The vehicle spare tire container has ribs for structural support, fluid tight seals, a protruding handle, and locking mechanisms. The container creates a safer design for spare tire changing, as well as eliminating the need for suspending the tire from the tire rim, hence using fewer components and a more economical design.

34 Claims, 5 Drawing Sheets

VEHICLE SPARE TIRE CONTAINER

FIELD OF THE INVENTION

The present invention relates to a vehicle storage container, and more particularly to a spare tire container for undercarriage storage of a vehicle tire on a vehicle.

BACKGROUND OF THE INVENTION

A wheel is a pneumatic tire mounted to a rim, the entire assembly referred to generally as tire hereinafter. The placement and mechanism for storage of spare tires has evolved through time based upon the vehicle type and areas available for storage. Larger vehicles, such as pick up trucks or sport utility vehicles, have encountered difficulty in storing spare tires due to the lack of a trunk compartment. In other vehicles with trunks, the spare tire has been stored within the compartment in a reservoir, protecting it both from the elements and the threat of theft. One of the more conventional methods of storing the spare tire on larger vehicles has been attached to the undercarriage beneath the vehicle chassis.

Inclement weather conditions can cause corrosion of the spare tire components, making it extremely difficult to remove the nuts, bolts, and other components holding the tire in place. The process of changing the spare tire can be dirty, time consuming, tedious, and ultimately dangerous for the vehicle operator. Various ideas have been implemented to encase the tire to prevent it from being exposed to weather conditions. All of these systems have suspended the spare tire through the tire rim, and attached the rim to the car body through either a cable or fixed mount. The spare tire is then encased by a cover that is either attached directly to the vehicle or attached to a plate that is mounted on the chassis. The known spare tire covers generally include a significant number of components and seals around the tire enclosure, enhancing the opportunity for moisture penetration.

By way of example, a U.S. Pat. No. 5,669,534 to Edgerley, discloses an undercarriage mounting for a spare tire. The spare tire is hoisted in position by a conventional lifting mechanism involving a lug at the end of the cable. The supporting framework is mounted to the vehicle body. A threaded stud projects downwardly from the lug to extend through an aperture in the bottom surface of a cup-shaped housing. A threaded nut tightens the housing against a panel mounted on the framework on the underside of the vehicle body, thereby, the spare tire is protected from the elements. The perceived drawbacks of this design are that it requires the operator to lie beneath the vehicle in order to release the spare tire cover to remove the multiple independent components.

A U.S. Pat. No. 5,823,413 to Seltz, also discloses an undercarriage container for a spare tire. The container is adapted to be fastened to an underside of a vehicle such that the planar member is adjacent to the underside of the vehicle. A seal is adapted to be positioned between the substantially planar member and the underside of the vehicle. The planar member contains an aperture for the protruding vertical member extending from the vehicle underside. The tire is mounted to the vehicle underside by attaching bolts beneath the underside of the rim to the vertical member. This supports the tire in position. A cover is attached by placing it over the tire and fastening two elastic straps. A drawback to this design is that it also requires the operator to be submerged beneath the vehicle creating a dangerous situation. The operator must remove the fastening straps, and then remove additional bolted components to finally release the spare tire.

Therefore, the need exists for a spare tire storage design that reduces the number of components to be unfastened for releasing the tire. This could be achieved by eliminating the need to mount the tire through the rim. Also, a decrease in the number of components is more economical for the manufacturer. The fewer seals and components generally that are in the spare tire holder, the less likely it is that moisture will infiltrate the seal and cause rusting and corrosion.

Also, a material that is lighter and more durable, while still providing protection from vandalism, is desirable for the underslung spare tire storage system. This would decrease the weight of the vehicle, increase the ease of handling the system in tire changing situations (due to lower friction and lighter weight) and possibly decrease manufacturing costs depending on the method of manufacture. An invention is needed to solve the aforementioned issues with the current spare tire designs available.

SUMMARY OF THE INVENTION

Accordingly, the present invention provides a storage container selectively attachable to a vehicle via a retractable suspension mechanism. The storage container comprises a thermoplastic unitary body including first and second portions integrally hinged to one another, wherein said first and second portions are foldable for defining an interstitial space. The storage container also includes at least one aperture disposed through said unitary body for operably interconnecting the storage container to the retractable suspension mechanism.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
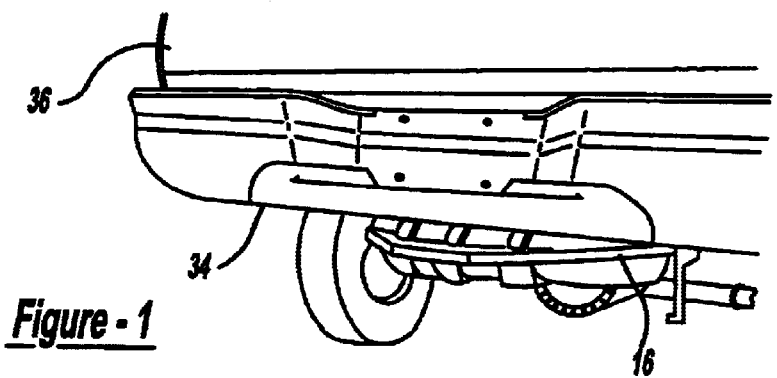
FIG. 1 is a perspective view of a first embodiment of a vehicle tire container of the present invention mounted to the undercarriage of a vehicle.
Figure 2:
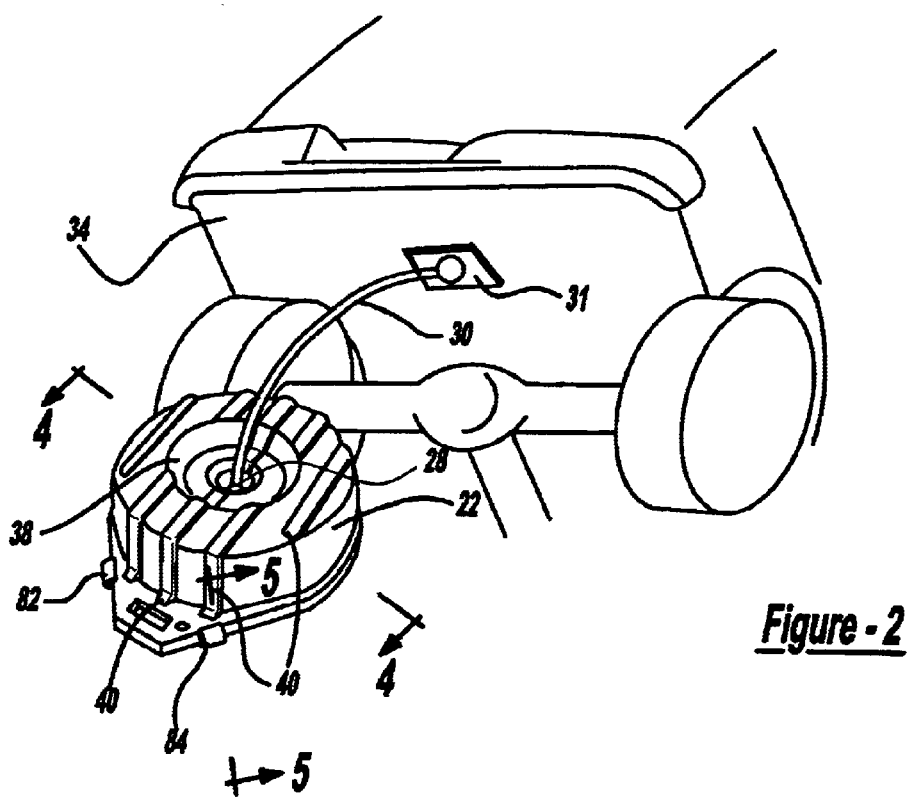
FIG. 2 is a perspective view of the first embodiment of a vehicle tire container dismounted from the vehicle cable suspension system.
Figure 3:
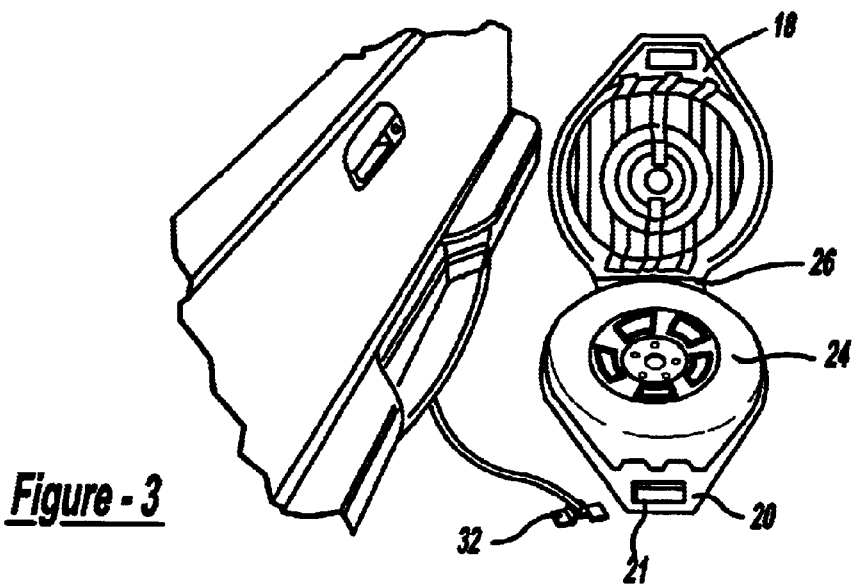
FIG. 3 is a perspective view of the first embodiment of a vehicle tire container opened and dismounted from the vehicle cable suspension system with the spare tire stored within.
Figure 4:
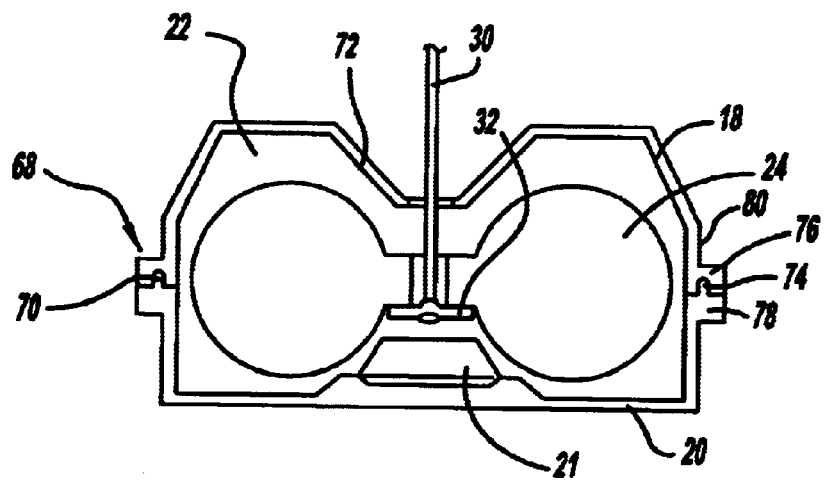
FIG. 4 is a cross sectional view along line 4–4' in FIG. 2 of the first embodiment of a vehicle tire container in closed position mounted on a cable suspension system.

The following descriptions of the preferred embodiments are merely exemplary in nature and are in no way intended to limit the invention, its application, or uses. Further, certain terminology is used in the following detailed description for convenience only and is not intended to be limiting. For example, the words "forward", "upper", and "lower" are intended to designate direction or orientation shown in the drawings to which reference is being made.

A first preferred embodiment of the present invention is depicted in FIGS. 1–4. The vehicle tire container 16 generally includes a substantially cylindrical thermoplastic unitary body consisting of first and second portions 18,20 created in a single step process. When folded, the first and second portions 18,20 form an interstitial cavity 22 for storage of a vehicle spare tire 24. The first and second portions 18,20 are integrally connected to one another and fold upon a one-way hinge 26, enabling the opening and closing of the vehicle tire container 16. The vehicle tire container 16 also preferably includes a forward protruding handle 21 that is integrally connected to both the first and second portions 18, 20.

The vehicle tire container 16 also includes an aperture 28 disposed through the first portion 18 through which a cable 30 of a vehicle cable retraction system 31 is interconnected. The cable 30 terminates in a horizontal member 32 that remains within the interstitial cavity 22. The retractable cable suspension system 31 originates in undercarriage 34 of a vehicle 36, and is raised into the vehicle 36 during normal operating conditions. When the cable 30 is retracted into the vehicle undercarriage 34, the horizontal member 32 disposed at the terminus of the cable 30 supports the vehicle tire container 16 adjacent to the vehicle undercarriage 34.

The aperture 28 is preferably located in a central area of the vehicle storage container 16. The aperture 28 sits at the lowest end of a truncated conical shaped depression 38, which follows the contours of the tire stored internally 72. The second portion 20 also includes a well 21 that protrudes towards the interstitial cavity 22, preventing unnecessary movement within the container 16. A surface of at least one of the first and second 18,20 portions also preferably contain a plurality of spaced apart and raised ribs 40 extending along the unitary body providing increased structural strength and shock absorption. In addition to providing structural strength and shock absorbing characteristics, the raised ribs, which are generally in contact with the substrate, allow for reduced drag when pulling the container along the substrate.

Figure 5:
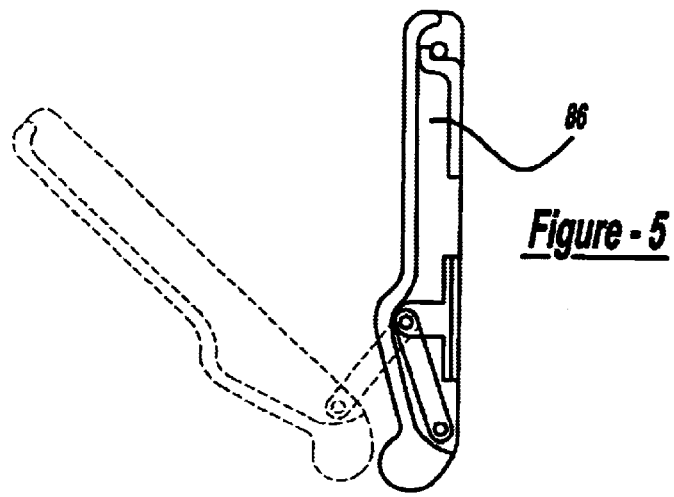
FIG. 5 is a cross sectional view along line 5–5' in FIG. 2 showing the vehicle tire container snap fastening lock mechanism.
Figure 6:
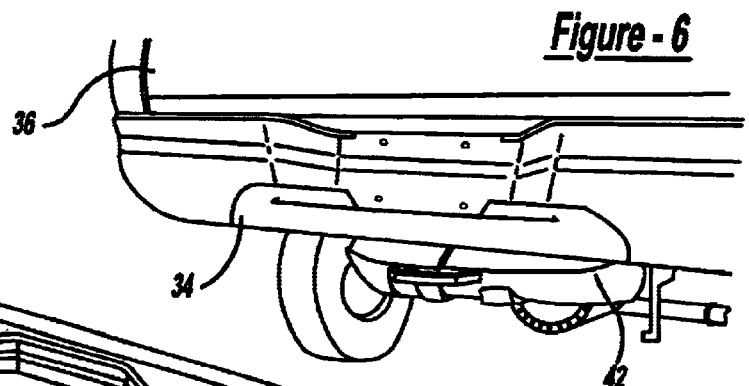
FIG. 6 is a perspective view of a second embodiment of a vehicle tire container mounted to the undercarriage of the vehicle.
Figure 7:
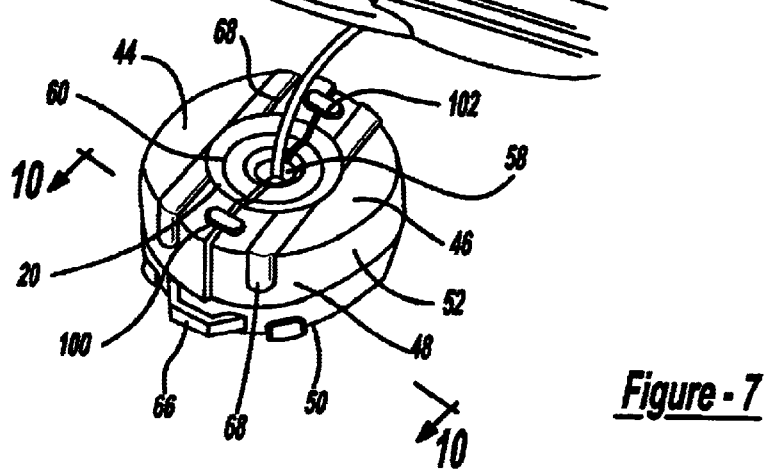
FIG. 7 is a perspective view of the vehicle tire container of FIG. 7 dismounted from the vehicle undercarriage.
Figure 8:
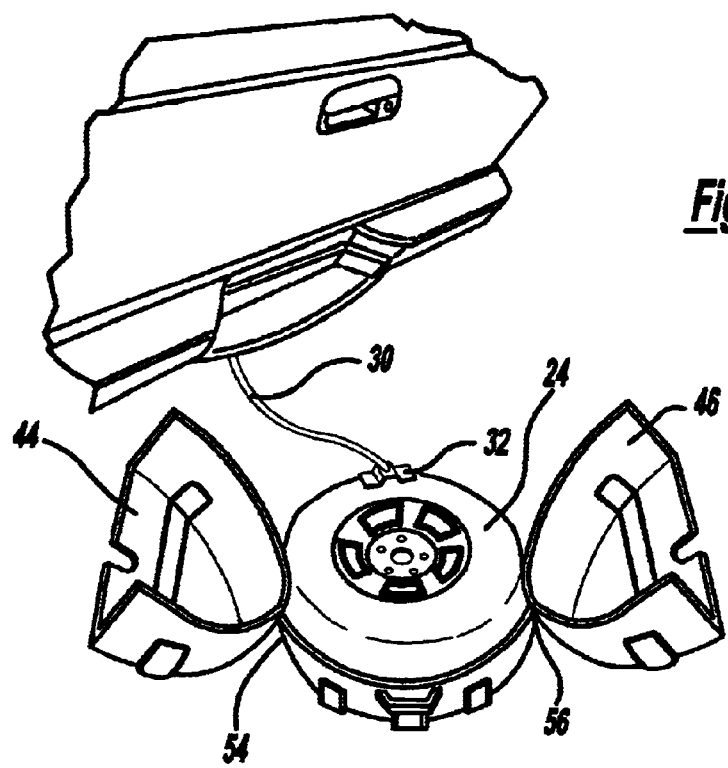
FIG. 8 is a perspective view of the second embodiment of the vehicle tire container opened and dismounted from the vehicle undercarriage with the spare tire stored within.
Figure 9:
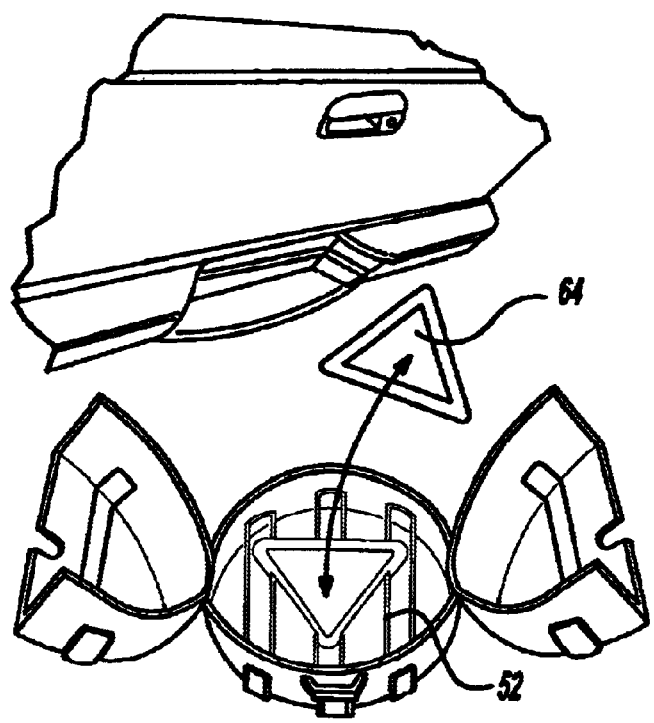
FIG. 9 is a perspective view of the second embodiment of the vehicle tire container opened and dismounted from the vehicle undercarriage without the spare tire stored within, showing safety device storage.
Figure 10:
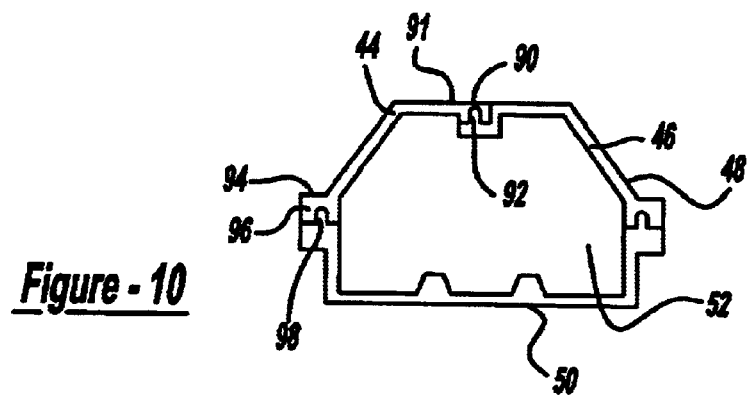
FIG. 10 is a cross sectional view along line 10–10' in FIG. 7, showing the second embodiment of the vehicle tire container in closed position.

Upon closing the vehicle tire container 16, edges of the first and second portions 18, 20 form a peripheral seal 68 by an interlocking mating joint 70. The joint 68 has a ridge 74 that extends around the edge of the perimeter of the second portion 20. This ridge 74 effectively serves as a shelf protruding from the surface of the edge of the second portion 20. The first portion 18 has a groove 76 extending along the perimeter of the edge of the first portion 18, which effectively serves as a contrapositive reservoir for receiving the shelf from the second portion 20. This prevents infiltration of the elements into the interstitial cavity 22. Where the two edges of the first and second 18,20 portions converge, they form a lip 68 which includes locking mechanisms 82,84. These locking mechanisms which may be selected from various known locking mechanisms, preferably latching locks, 86, as shown in FIG. 5 which releasably hold the first and second portions 18, 20 together. While not specifically shown, the vehicle tire may also include apertures for the insertion of a padlock or may include an integral key or tumbler type lock for securing the container in a closed position.

An alternate second preferred embodiment of a vehicle tire container of the present invention is depicted in FIGS. 6–10. The alternate vehicle tire container 42 which also has a cylindrical unitary thermoplastic body consisting of first and second portions 48,50 created in a single step process. The first portion 48 is divided into dual panels 44,46 that form a split top configuration. When the panels 44,46 are closed against the second portion 50 they form an interstitial cavity 52 for storage of a vehicle spare tire 24. The dual panels 44,46 are integrally connected to the second portion 50 at substantially opposite ends and each folds along a one-way hinge 54,56, enabling container access.

The vehicle tire container 42 also contains an aperture 58 disposed through the first portion 48 where a cable 30 from the vehicle cable retraction system 31 is interconnected in the same fashion as the preferred embodiment. The cable 30 terminates in a horizontal member 32 that remains within the interstitial cavity 52. The retractable cable suspension 31 system originates in the undercarriage 34 of the vehicle 36, and is raised into the vehicle 36 during normal operating conditions. When the cable 30 is retracted into the vehicle underside 34, the horizontal member 32 disposed at the terminus of the cable 30 supports the vehicle tire container 42 adjacent to the vehicle undercarriage 34.

The aperture 58 is located in a central area of the vehicle storage container 42. The aperture 58 sits at the lowest end of a truncated conical shaped depression 60, which follows the contours of the tire 24 stored internally. This prevents unnecessary movement within the container. The surface of at least the second portion 50 includes longitudinal ribs 62 extending along the unitary body for increased structural strength and shock absorption.

The vehicle tire container 42 has a forward protruding handle 66 that is integrally connected to the second portion 50. Upon closing the vehicle tire container 42, the dual panels 44,46 of the first portion 48 form a seal 91 when closed in an overlap position. The joint has a ridge 92 that extends along the edge of the perimeter of the lower panel portion 46 that faces the interstitial cavity 52. This ridge 92 effectively serves as a shelf protruding from the surface of the edge. The upper panel portion 44 has a groove 90 extending along an edge of the upper portion facing in towards the interstitial cavity 52, which effectively serves as a contrapositive reservoir for receiving the shelf from the mating panel 46. Edges of the first and second portions 48,50 also form a peripheral seal 94 by an interlocking mating joint. This joint functions the same way as the sealed joint between the dual panels. A ridge 98 extends around an edge of the perimeter of the second portion 50. This ridge 98 also effectively serves as a shelf protruding from the surface of the edge of the second portion 50. The first portion 48 has a groove 96 extending along the perimeter of an edge of the first portion 48, which effectively serves as a contrapositive reservoir for receiving the shelf from the second portion 50. This prevents infiltration of the elements into the interstitial cavity 52 both by sealing the seams between the dual panels 44,46 and between the first and second 48,50 portions. Along the edge of the sealed edges are locking mechanisms 100,102.

Figure 11:
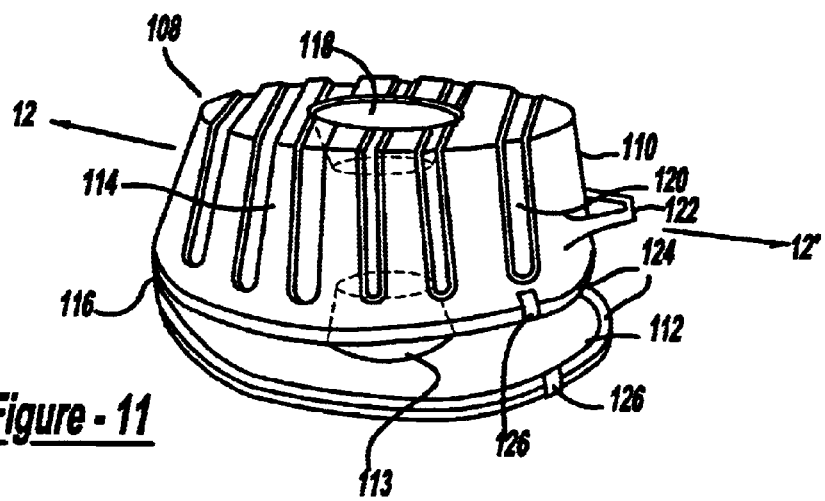
FIG. 11 is a perspective view of a third embodiment of a vehicle tire container slightly opened and dismounted from the vehicle undercarriage with the spare tire removed.
Figure 12:
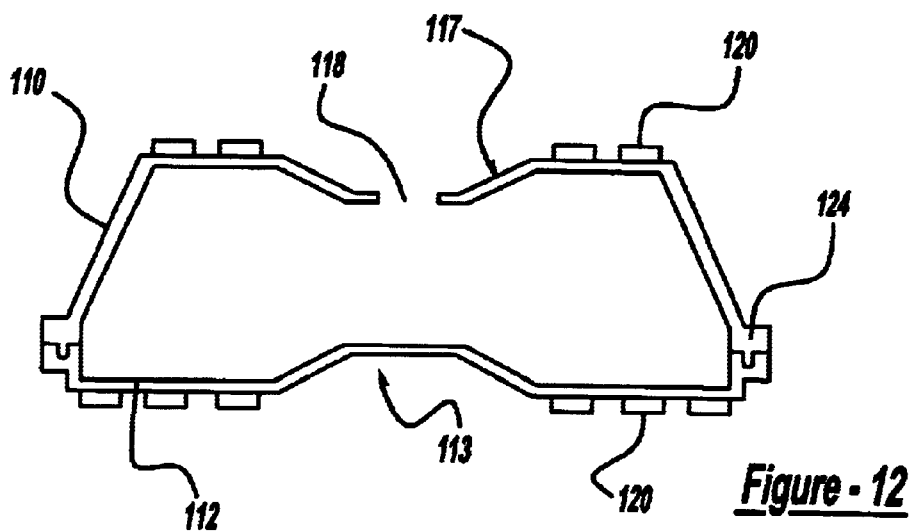
FIG. 12 is a cross sectional view along line 12–12' in FIG. 11, showing the third embodiment of the vehicle tire container in a closed position.

An alternate third preferred embodiment of a vehicle tire container of the present invention is depicted in FIGS. 11 and 12. The alternate vehicle tire container 108 has a cylindrical unitary thermoplastic body consisting of first and second portions 110, 112 created in a single step process. The first portion 110 forms a cylindrical shape following the contours of a tire 24. The second portion 112 is a substantially planar section, which preferably contains a inwardly protruding well 113. When the first portion 110 is closed against the second portion 112 they form an interstitial cavity 114 for storage of a vehicle spare tire 24. The first and second portions 110, 112 are integrally connected to one another and fold upon a one-way hinge 116, enabling the opening and closing of the vehicle tire container 108. The third embodiment operates in a substantially similar manner to the first and second embodiments, which includes a preferably centrally located aperture 118 through the first portion 110. The aperture 118 sits at the lowest end of a truncated conical shaped depression 117, to prevent movement of the tire 24 within. The aperture 118 receives the cable 30 which connects it to the vehicle suspension system 31. The third embodiment also includes ribs 120, a handle 122, a sealing joint 124, and locks 126 that operate in a similar manner to the first and second embodiments described above.

The three preferred embodiments can be constructed by numerous thermoplastic manufacturing methods, including blow molding, vacuum forming, or injection molding. Under a blow molding fabrication process a heated plastic hollow tube, generally known in the art as a parison, into a mold. The mold is a hollow cavity that is generally divided into two segments. The parison is forced into the shape of the mold by the use of air pressure. Thus, the plastic assumes the shape of the spare tire container mold. The vehicle latches can be attached to the spare tire container after the formation process.

In an alternate thermoplastic manufacturing method of vacuum forming, a sheet of plastic is clamped down onto a stationary frame. Heat and negative pressure are applied, and the plastic is drawn down onto the surface of the mold. The latches can be placed inside the mold prior to the introduction of the vacuum and heat conditions. The spare tire container with latches is integrally formed by this process.

Another method of thermoplastic manufacturing is injection molding. A plastic is heated and softened, where it is forced into a relatively cool mold. The mold is a closed container, where the internal pressure within the cavity forces the plastic into the conformation of the mold. The plastic is allowed to cool, where it is set into the shape of the spare tire container, and then released from the mold. The latches can be affixed to the spare tire container after the fabrication process. Any of these methods or equivalents known to one skilled in the art may be employed to fabricate the spare tire container(s) of the present invention.

The foregoing description of the invention is merely preferred in nature and, thus, variations that do not depart from the gist of the invention are intended to be within the scope of the invention. Such variations are not to be regarded as a departure from the spirit and scope of the invention.

What is claimed is:

1. A storage container attachable to a vehicle, the storage container comprising:
   a unitary body having a first and a second portion, said first and second portions integrally hinged to one another and operable to define a storage space capable of accommodating a vehicle tire in a closed position; and
   a mounting portion on said unitary body, said mounting portion facilitating attachment of the storage container to a vehicle.

2. The storage container according to claim 1, wherein said first portion is divided into a duality of panels, each of said panels hingedly connected to said second portion.

3. The storage container according to claim 1, further comprising a plurality of spaced apart raised ribs extending along a surface of at least one of said first and second portions.

4. The storage container according to claim 1, further comprising a protruding handle integrally formed in at least one of said first and second portions.

5. The storage container according to claim 1, further comprising a handle protrusion integrally formed in each of said first and second portions.

6. The storage container according to claim 1, wherein said first and second portions form a sealed joint in a closed position.

7. The storage container according to claim 1, wherein said unitary body is fabricated by a blow molding process.

8. The storage container according to claim 1, wherein said unitary body is fabricated by a vacuum forming process.

9. The storage container according to claim 1, wherein said unitary body is fabricated by an injection molding process.

10. The storage container according to claim 1, wherein said mounting portion includes at least one aperture formed through said unitary body.

11. The storage container according to claim 1, further comprising a lock mechanism for securing said first and second portions in a closed position.

12. The storage container according to claim 11, wherein said lock mechanism comprises a snap lock mechanism for securing said first and second portions in said closed position.

13. A storage container attachable to a vehicle, the storage container comprising:
   a unitary body including first and second portions integrally hinged to one another, said first and second portions foldable to define an interstitial storage space for a vehicle tire; and
   a mounting portion formed integrally with said first and second portions, said mounting portion including a central recess having an aperture disposed through said first and second portions.

14. The storage container according to claim 13, wherein said first portion is divided into a duality of panels, each of said panels hingedly connected to said second portion.

15. The storage container according to claim 13, further comprising a protruding handle integrally formed in at least one of said first and second portions.

16. The storage container according to claim 13, further comprising a handle protrusion integrally formed in each of said first and second portions.

17. The storage container according to claim 13, wherein said first and second portions form a sealed joint in a closed position.

18. The storage container according to claim 13, wherein said unitary body is fabricated by a blow molding process.

19. The storage container according to claim 13, wherein said unitary body is fabricated by a vacuum forming process.

20. The storage container according to claim 13, wherein said unitary body is fabricated by an injection molding process.

21. The storage container according to claim 13, wherein at least one of said first and second portions includes a plurality of raised ribs to strengthen said unitary body.

22. The storage container according to claim 13, further comprising a lock mechanism for securing said first and second portions in a closed position.

23. The storage container according to claim 22, wherein said lock mechanism comprises a snap lock mechanism for securing said first and second portions in said closed position.

24. A storage container attachable to a vehicle via a suspension mechanism, the storage container comprising:
- a unitary body including first and second portions integrally hinged to one another, said first and second portions operable to define a storage space capable of accommodating a vehicle tire, said first portion is divided into a duality of panels, each of said panels hingedly connected to said second portion; and
- an aperture formed through said first and second portions of said unitary body for operably interconnecting the storage container to the suspension mechanism.

25. The storage container according to claim 24, further comprising a plurality of spaced apart raised ribs extending along a surface of at least one of said first and second portions.

26. The storage container according to claim 24, further comprising a protruding handle integrally formed in at least one of said first and second portions.

27. The storage container according to claim 24, further comprising a handle protrusion integrally formed in one of said first and second portions.

28. The storage container according to claim 24, wherein said first and second portions form a sealed joint in a closed position.

29. The storage container according to claim 24, wherein said unitary body is fabricated by a blow molding process.

30. The storage container according to claim 24, wherein said unitary body is fabricated by a vacuum forming process.

31. The storage container according to claim 24, wherein the-said unitary body is fabricated by an injection molding process.

32. The storage container according to claim 24, wherein said aperture is formed through a central depression of said unitary body.

33. The storage container according to claim 24, further comprising a lock mechanism for securing said first and second portions in a closed position.

34. The storage container according to claim 33, wherein said lock mechanism for securing said first and second portions in said closed position is a snap lock mechanism.

* * * * *